United States Patent [19]
Kovolick et al.

[11] Patent Number: 6,059,976
[45] Date of Patent: May 9, 2000

[54] RECLAMATION OF SPENT ALUMINUM ROLLING COOLANT OILS, EMULSIONS AND DISPERSIONS

[75] Inventors: Al J. Kovolick, Tracy; Robert A. Dickinson, Pleasanton; Michael A. Green, Livermore, all of Calif.

[73] Assignee: Kaiser Aluminum & Chemical Corporation, Pleasanton, Calif.

[21] Appl. No.: 09/102,111

[22] Filed: Jun. 22, 1998

Related U.S. Application Data

[60] Provisional application No. 60/056,238, Aug. 28, 1997.
[51] Int. Cl.[7] .......................... B01D 17/05; C10M 175/04
[52] U.S. Cl. .......................... 210/708; 210/709; 210/737; 208/183
[58] Field of Search ..................................... 210/708, 709, 210/724, 737; 208/183, 188, 179

[56] References Cited

U.S. PATENT DOCUMENTS

| | | |
|---|---|---|
| 3,790,474 | 2/1974 | Moffitt . |
| 3,835,035 | 9/1974 | Fainman . |
| 4,357,243 | 11/1982 | Dobrez et al. . |
| 4,411,774 | 10/1983 | Johnson . |
| 4,797,214 | 1/1989 | Sevier ..................................... 210/708 |
| 4,961,858 | 10/1990 | Spei et al. ............................... 210/737 |
| 5,090,225 | 2/1992 | Schimion ................................. 72/201 |
| 5,262,071 | 11/1993 | Tuck ....................................... 210/805 |

*Primary Examiner*—David A. Simmons
*Assistant Examiner*—Frank M. Lawrence
*Attorney, Agent, or Firm*—Jones, Tullar & Cooper

[57] ABSTRACT

The present invention is a process for reclaiming and recycling oil/water mixtures. These mixtures are preferably hot or cold rolling oils for aluminum manufacturing operations. When used, the rolling oils contain organometallic particles and have less constituents than the unused oils. The present process enables the valuable portion of the oil to be reused by passing through an acid wash and a reconstitution process.

22 Claims, No Drawings

RECLAMATION OF SPENT ALUMINUM ROLLING COOLANT OILS, EMULSIONS AND DISPERSIONS

The present application is a continuation-in-part of provisional application no. 60/056238 filed Aug. 28, 1997, incorporated by reference in its entirety.

FIELD OF THE INVENTION

The present invention is a process for the recycling of spent oil/water mixtures. More specifically, it is a process for the rejuvenation or regeneration of spent oil/water mixtures used in the metal processing industry.

BACKGROUND OF THE INVENTION

In the processing of aluminum flat-rolled products such as sheet or plate, typical practices include hot rolling the cast ingot into thinner pieces. This hot rolling might produce plate product, sheet product and/or coil stock that can then be later cold rolled to final gauge or be sold directly off the hot mills. In the hot rolling operation, it is essential to provide a lubricating and cooling medium at the roll bite that will allow friction control, remove heat from the rolls, control the temperature of the metal workpiece and provide an environment that controls the transference of aluminum to the rolls and then back onto the strip. This phenomenon is called "pickup". Lubricating coolants used in the aluminum industry can be dispersions of oil-in-water. In the case of dispersions stabilized with surfactants, they are called emulsions. In service, these dispersions and emulsions become contaminated with aluminum wear debris as a consequence of the action of the hard steel rolls sliding over the soft aluminum during the rolling operation. Also, the chemically active ingredients in the rolling oil, typically fatty acids, become chemically combined with the nascent aluminum and, while forming metallic soaps, become used up, thus lowering the lubricating effectiveness of the oil in the emulsion or dispersion. When the contamination due to metallic particles and the reduction of the chemically active fatty acids in the dispersion or emulsion becomes too great, the performance of the emulsion with respect to its ability to provide the proper friction in the roll-bite, its ability to control pickup and its ability to remove heat satisfactorily, deteriorates to unacceptable levels.

Until now, the only way to reestablish the desired performance is to discard the in-service lubricant now called "spent" lubricant, and make up the dispersion or emulsion with new water and oil. This is a costly procedure and, additionally creates a disposal issue with regards to the spent dispersion or emulsion.

SUMMARY OF THE INVENTION

The present invention is a process for the reclamation of spent aluminum rolling oils, emulsions and dispersions, consisting essentially of iterations of one or more of the following steps: heating a spent aluminum rolling oil, emulsion or dispersion, which comprises an oil/water mixture containing oils, additives, and organometallic particles, to a temperature between 100° F. and less than 212° F.; contacting the reaction mixture with an acidic solution to form a reaction mixture having a pH of between 0.5 and 2.5; separating the reaction mixture into a predominantly oil phase and a predominantly aqueous phase; analyzing the oil phase to determine its constituents; and reconstituting the oil phase.

A pretreatment step is preferred when emulsions are the feedstock for the process and it comprises adding to the emulsion a sufficient quantity of an acidic solution having a pH about 1.5 and a temperature between 150 and less than 212° F., to form a reaction mixture, the reaction mixture containing predominant phases of approximately 20 to 30% oil to 70 to 80% water; vigorously agitating the reaction mixture; separating the reaction mixture into a predominantly oil phase and a predominantly aqueous phase; analyzing the oil phase to determine its constituents; and reconstituting the oil phase by adding back constituents to achieve amounts found in the rolling oil prior to use.

Among other factors, the present invention is the discovery that rolling oils can be reclaimed after use so that they do not have to be purchased as frequently and do not need to be disposed of as hazardous waste.

More specifically, the present invention comprises a process for the reclamation of spent aluminum rolling coolant oils, emulsions and dispersions, consisting essentially of iterations of one or more of the following steps: contacting a spent aluminum rolling oil, emulsion or dispersion, which comprises an oil/water mixture which contains oils, additives, and organometallic particles, with an acidic solution, wherein the acid is selected from the group consisting of sulfuric, phosphoric and hydrochloric, to form a reaction mixture having a pH from between 1 and 2; heating the reaction mixture to a temperature between 180 and less than 212° F.; vigorously agitating the reaction mixture; allowing the reaction mixture to separate into a predominantly oil phase and a predominantly aqueous phase by settling for between 2 and 120 hours; discarding the aqueous phase; analyzing the oil phase to determine its constituents; and reconstituting the oil phase by replacing the additives to substantially the same level as in the unused oil phase, the additives comprising antioxidants, corrosion inhibitors, biocides, and load bearing additives.

DETAILED DESCRIPTION OF THE INVENTION

The present invention is a process in which the oil, dispersion or emulsion is treated with a low concentration of strong acid so that the oil in it substantially separates from the water and can be skimmed off the top or the water can be drained off the bottom. In one embodiment, the resulting oil-enriched mixture of oil and water and any other floated oil in the mixture, called "skim oil" can then be treated with a high concentration of strong acid to quickly dissolve the aluminum wear debris particles called "fines" and convert the metallic soaps back to their fatty acids. The aluminum is thus put into solution in the water phase and can be separated by gravity settling or some other means and disposed of in normal waste water treatment operations. The oil obtained by such a process is valuable because it contains most of the original components of the new oil and can be reconstituted by adding back those components that were lost in the water phase as well as those lost by in-service use. Once reconstituted, the oil will perform substantially like new oil without the contamination of aluminum wear particles and metallic soaps. A regular program of removing a portion of nearly spent emulsion coolant, processing it as described above and reintroducing the reconstituted oil phase back into the mill coolant system will provide for a more consistent coolant process, will have a positive environmental impact, and will be more economical than making periodic discards to waste.

It is contemplated that the preferred process be employed to rejuvenate fluids that comprise oil or oil and water and which contain organo-metallic particles. More specifically, these fluids are used in the metal processing industry, such as the aluminum industry. More specifically, it is contemplated that the process is applied to the rejuvenation of fluids that are used as rolling oils used in aluminum hot- or cold-rolling plants.

The Lubricant

Fluids are used in rolling mills to control friction of the rolls against the workpiece, remove heat from the process and carry away the wear-debris produced. These fluids can be called lubricants, coolants, rolling oils, and rolling solutions. They are typically divided into three types, straight oils, dispersions and emulsions depending on their composition and preparation for use. Oils alone are typically used where heat removal requirements are not too severe, such as in the low speed cold rolling of aluminum. These oils are usually petroleum based (e.g. mineral oils or derivatives of mineral oils) with some additives. The additives can consist of load-bearing and friction modifiers, viscosity modifiers, antioxidants, corrosion inhibitors and biocides. When a greater ability to remove heat is required in the metalworking operation than is possible with straight oils, it is necessary to utilize the superior heat removing capability of water in the lubricant. If the oil composition is to be used as a mixture in water, the oil phase is referred to as neat oil. When neat oil is mixed into water it may produce a quasi-stable mixture due to the amount of energy put into the system by the mixing process. This kind of mixture is referred to as a mechanically stabilized dispersion or mechanical dispersion. It's ability to remain homogeneous over an extended period of time is dependent on the shear put into the mixing step. If the neat oil also contains emulsifiers, it will be able to remain homogeneous for longer periods of time because the emulsifiers prevent the oil droplets from coalescing as rapidly. This kind of mixture is typically referred to as a chemically stabilized dispersion or emulsion. Although the neat oils are not actually dissolved in the water phase, chemically stabilized emulsions are sometimes referred to as soluble oils. Neat oils used in making mechanical dispersions and emulsions also contain load-bearing and friction modifiers, viscosity modifiers, antioxidants, corrosion inhibitors and biocides.

It is well-known that non-soluble oils such as straight mineral oils or fatty oils, i.e., without water present, are not completely satisfactory for the working of metals from the standpoint of cooling ability. Thus, oil-in-water emulsion-type lubricants based on mineral or fatty oils have been used conventionally for plastic deformation processes in which a high cooling ability is required in, for example, the hot rolling of aluminum, the manufacturing of aluminum cans by a drawing and ironing process, the cold rolling of steel and so forth. These contain one or more emulsifiers including conventional emulsions contain as an emulsifier, anionic surfactants such as petroleum sulfonates, resin soaps, fatty acid soaps, etc., or nonionic surfactants such as sorbitan alkyl esters, polyoxyethylene sorbitan alkyl esters, etc., having a good cooling ability. Conventional water-soluble lubricating compositions for metal working are disclosed in, for example, U.S. Pat. Nos. 3,492,232, 3,496,104, 3,634,245, and are hereby incorporated by reference in their entireties. Preferred commercial rolling oils include Tandemol T95S6, manufactured by Houghton International Inc., Valley Forge, Pa.

Some oil-soluble nonionic surfactants can also function as load-bearing additives. Since oil-soluble surfactants cannot be dissolved in water by themselves, water-soluble nonionic surfactants are often used as a solubilizers for them. Since the phosphate esters (and/or their salts) and/or fatty acid soaps employed in the water-soluble lubricants of the present invention are highly surface-active and have a fairly strong affinity for oil-soluble surfactants, they function to associate with the fines that are present in the fluids.

In some cases, the lubricants used to roll aluminum are water-soluble and are used by dilution with water, forming transparent or semi-transparent solutions. Since the solutions are single-phase and highly surface-active, they show improved stability, improved cooling ability, excellent uniform lubrication and increased bite of the rolls. The metal working lubricants typically include nonionic surfactants, oil-soluble nonionic surfactants and phosphate esters and/or salts of fatty acids and are used by dilution with water. When diluted, the lubricants of the present invention can further be combined with water-soluble solvents, such as glycols, glycol ethers and so forth, e.g., in an amount of up to about 20% by weight based on the total weight of the composition. These solvents provide the lubricants with better solubility. Preferred solvents are ethylene glycol, polyethylene glycols having a molecular weight of less than about 600, alkylene glycols having less than about 6 carbon atoms, glycol ethers of lower alcohols having less than about 4 carbon atoms and lower alkanolamines. Additionally, mineral or fatty acids can be combined with the lubricants of the present invention to adjust lubricity, to the extent that the water-solubility is not lost, e.g., in an amount of up to about 20% by weight based on the total weight of the composition.

The nonionic surfactants can include polyoxyalkylene glycol esters of fatty acids, polyoxyalkylene glycol ethers of fatty alcohols, polyoxyalkylene glycol ethers of fatty alcohols esterified with fatty acids and polyoxyalkylene glycol condensates of glycerides esterified with fatty acids. The compositions can be considerably varied in proportion: about 10 to 60% by weight of water-soluble nonionic surfactants, about 10 to 40% by weight of water-insoluble (or oil-soluble) nonionic surfactants and about 10 to 50% by weight of the phosphate esters or fatty acid salts.

The load bearing and friction modifying additives are typically compounds such as fatty acids, esters of short chain alcohols and fatty acids, esters of polyhydric alcohols and fatty acids, fatty alcohols and esters and partial esters of phosphoric acid. Examples of fatty acids are mono- or di-carboxylic acids, either saturated or unsaturated and would include lauric acid, myristic acid, palmitic acid, stearic acid, oleic acid, isostearic acid and dimerized oleic acid and mixtures of these. Examples of esters of short chain alcohols and fatty acids would include methy laurate, methyl myristate, methyl palmitate, methyl stearate, methyl oleate, butyl stearate, isopropyl laurate, isopropyl myristate, and isopropyl palmitate and mixtures of these. Examples of polyhydric alcohols and fatty acids include, glycerol mono-, di- and tri-oleate, glycerol mono-, di- and tri-isostearate, and full and partial esters of pentraerythritol oleate and pentraerythritol isostearate. Examples of fatty alcohols would include lauryl alcohol, cetyl alcohol, tetradecyl alcohol and mixtures of these. Examples of esters and partial esters of phosphoric acid would include tricresyl phosphate, tributyl phosphate, ethylhexylphosphate, triethylhexylphosphate and mixtures of these. Antioxidants may include butylated hydroxy toluene, butylated hydroxy anisole and citric acid. Corrosion inhibitors may include sodium or potassium sulfonates, tolytriazoles or complex aryl polyols. Biocides may include gluteraldehyde, formaldhyde, triazine and isothiazolone.

The Process

We intend to reverse the chemical change that the oil undergoes while in-service and remove the small wear-debris particles formed in the rolling operation by contacting the oil and the wear debris particles in it with aqueous solutions of strong acids. The actual chemical changes that occur when the strong acid contacts the oil and wear debris particles are preceded by an oil enrichening step whereby a large amount of the water in the mechanical dispersion or emulsion is removed prior to the addition of the aqueous solution of strong acid. Following the addition of strong acid, and after a suitable reaction time, the aqueous phase is removed, the resulting oil is analyzed and any necessary components are added back into the acid-treated oil. More specifically, our ideas would employ a washing step in which a hot aqueous solution of a strong acid with a pH of approximately 1.5 is contacted with the oil and the wear-debris and organo-metallic compounds formed during the in-service use of the oil are solubilized into the water phase. The parameters of the process involve the choice of acid and pH, time for contact, temperature, mixing conditions, water separation mechanism and analytical process for determining the necessary ingredients to add back to the acid-treated oil. Manipulation of these variables will contribute to the success of the process.

Acids that can be used in the present invention preferably include one or more of the following: sulfuric, hydrochloric, nitric, acetic, citric, hydrofluoric, hydrobromic, and phosphoric. Sulfuric, phosphoric, and hydrochloric are more preferred, and sulfuric is most preferred. When sulfuric is used, it is preferred to add it as sodium bi sulfate, a solid. The preferred pH of the mixture containing the acid solution and the oil water mixture is at least 0.5, more preferably at least 1, most preferably about 1.5. Preferably, the pH is no more than 2.5, more preferably no more than 2. A pH above 2.5 can be employed, however, the reaction time is longer.

The acid solution and lubricant are mixed and heated to a temperature between 100 and less than 212° F., more preferably between 150 and 205° F., most preferably between 180 and 200° F. Preferably the acid solution is steam heated. We have received good results when phosphoric acid is heated to over 200° F.

Following the reaction, the mixture is separated into predominantly oil and aqueous phases. Any means to accomplish this result is acceptable, such as gravity settling, centrifugation, and the like. Preferably, the mixture is allowed to settle under the influence of gravity to permit the oil phase to separate from the acidic water phase. This separation is best accomplished when the mixture is kept warm. Preferably, the settling time is at least 2 hours, more preferably 8 hours, and most preferably 48 hours. Preferably, the settling time is no more than 120 hours, more preferably, no more than 96 hours, and most preferably, no more than 72 hours. At the conclusion of the settling time, the phases can be separated by draining off the acidic water phase or by further centrifuging the mixture.

The rejuvenation of an emulsion preferably requires a pretreatment step before the above steps are used. "Used" or "spent" emulsion typically contains a layer of "skim" oil that rides on the surface of the emulsion. Typically, the concentration of oil in the skim oil is about 25%. The oil concentration in the body of the emulsion is between 2 and 15%. Acid addition to the emulsion would be inefficient with a concentration of oil that is this low. Accordingly, a sufficient quantity of an acid solutions (a small amount) is added to the emulsion to "break" the oil out of the emulsion to concentrate the oil and to make it more like the skim oil. The target pH for the acidic solution/oil-water mixture in this pretreatment step is between 3 and 4. A preferred concentration is between 20 and 30% oil and between 70 and 80 % water.

Preferably, the acid solution, the times, the temperatures, pHs, and shear forces of the pretreatment step are the same as those recited above.

After the pretreatment step, a fluid is obtained which contains a water phase, a "cuff" which contains an emulsion, and an oil/water phase. The oil/water phase may be removed to be treated by the process above, the water phase can be discarded and the pretreatment can be performed again to the cuff to extract more oil. These steps can be repeated as necessary and economical. The oil phase can be added to a larger volume of oil that is reconstituted.

Reconstitution

After use in a rolling mill and processing by the present process, the oil/water phase is depleted of some components that were present in the original lubricant (and the H may be too low). Accordingly, it is analyzed to determine which components are missing and which need to be added back to the mixture. The mixture can be analyzed using conventional devices and techniques, such as checking pH, using high pressure liquid chromatography (HPLC), Fourier Transform Infra Red analysis, gas chromatography (GC), and a determining the viscosity using a viscosimeter. The upper and lower acceptable limits of viscosity are unique for each lubricant type and application and must be determined by the user.

A typical method for reconstitution can be as follows. The analysis methods will determine what compounds are needed and they are added back into the mixture. They are typically the additives which can be lost or oxidized during normal operation or the process itself. If, after the additions, the output from the above process yields a neat oil having an additive concentration of 5%, for example, and the final concentration should be 10%, then additional additive is added to bring up the concentration. However, the final viscosity may need to be adjusted as well. Since there are two variables to adjust, the process can be run in two steps. First, the additive concentration can be adjusted to the final concentration as noted above. Then, the viscosity can be adjusted. A preferred method uses a second solution having an additive concentration that is the same as the first solution (that is already at the target). Then, the viscosity of the first solution is measured, and the second solution is constructed having a viscosity that, when added in the correct proportions to the first solution, will correct the first solution to the final viscosity value. Other methods that attempt to adjust both additive concentration and viscosity simultaneously can also be used.

EXAMPLE I

The present process was run and compared to the process as outlined in U.S. Pat. No. 3,790,474 and a control in Examples I and II. Used rolling oil and emulsion (when new, this rolling oil was Tandemol T95S6, manufactured by Houghton International Inc., Valley Forge, Pa.) was taken from commercial rolling equipment and treated in accordance with the process of U.S. Pat. No. 3,790,474 in Example I For example, two samples (#1 and #2) were treated as follows: 750 ml of oil and 750 of emulsion were mixed and heated to 200° F. The samples were contacted with 40 ml of 50% NaOH and mixed at 600 and 200 rpm respectively for 24 hours. This was done by stirring using a flat 1-inch by ½ inch stirring blade turning in a 2 liter roundbottom glass vessel while maintaining temperature at 200° F. Thereafter, while still stirring, the reaction mixtures were contacted with 40 ml of 93% $H_2SO_4$. The mixtures were stirred at 600 and 200 rpm, respectively for an additional 24 hours. The mixtures were allowed to settle for 72 hours and then they were separated into oil and water fractions. The oil phases for all the samples were analyzed for esters, fatty acids (FA), metallic soaps (MS) and organic soaps (OS) as measured by the sample absorbance when placed in an infra red spectrophotometer. The absorbances for ester, fatty acid, metallic soap and organic soap were calculated from the percent transmission at the following wave numbers respectively: ester; 1750 cm$^{-1}$, fatty acid; 1710 cm$^{-1}$, metallic soap; 1610 and 1585 cm$^{-1}$ and organic soap; 1560 cm$^{-1}$. The absorbances thus obtained are shown in the table below. An unused sample of Tandemol T95S6 was analyzed for a comparison. Table 1 shows the differences between the unused oil and the process shown in the prior art patent at two levels of sample agitation.

TABLE 1

| Sample ID | Absorbance | | | | pH @ 7% | % H$_2$O |
|---|---|---|---|---|---|---|
| | Ester | FA | MS | OS | | |
| Control | 0.598 | 0.718 | 0 | 0.204 | 7.5 | 0 |
| 1 | 0.394 | 1.365 | 0.099 | 0.052 | 3.8 | 0 |
| 2 | 0.376 | 1.467 | 0.096 | 0.048 | 3.5 | 0 |

EXAMPLE II

Used oil was collected from commercial rolling equipment as in the above Example, also the control sample was the same type of oil as recited above. Sample 1 was treated in accordance with U.S. Pat. No. 3,790,474 and was contacted with 27 ml of 50% sodium hydroxide for 24 hours. This was done while stirring using a flat 1-inch by ½ inch stirring blade turning at 600 rpm in a 2 liter roundbottom glass vessel while maintaining temperature at 200° F. Then, both sample 1 and sample 2 were contacted with 27 ml of 93% sulfuric acid employing the same stirring and heating conditions as previously described. Sample 1 was contacted for 24 hours. Sample 2 was contacted for 48 hours thus giving the same total reaction time. Following this, the samples were allowed to settle under gravity for 72 hours while the temperature was maintained at 200° F. After cooling, the oil phases were then drawn off and analyzed using an infra-red spectrophotometer as for Example I. The results show the differences between the present process and the prior U.S. patent and are as follows

TABLE 2

| Sample ID | Absorbance | | | | pH @ 7% | % H$_2$O |
|---|---|---|---|---|---|---|
| | Ester | FA | MS | OS | | |
| Control | 0.598 | 0.718 | 0 | 0.204 | 7.5 | 0 |
| 1 | 0.363 | 1.292 | 0.089 | 0.051 | 3.5 | 0 |
| 2 | 0.501 | 1.229 | 0.075 | 0.047 | 3.5 | 0 |

Sample 1 was the product of the caustic plus acid process (U.S. Pat. No. 3,790,474) and sample 2 was the product of the present acid-only process. Conditions for both are: 500 ml emulsion and 500 ml skim oil were mixed and heated to 200° F.

Examples I and II show that there is a statistically significant difference between the ester content in the samples treated in accordance with U.S. Pat. No. 3,790,474, and the present process or the new oil. Tables 1 and 2 show that the sample run according to the present process is more similar to the new oil in ester content than that of the prior art process. The loss of the ester component requires that it be added back into the mixture, which is expensive and time consuming.

It will be understood that various changes and modifications can be made in the details of construction and use without departing from the spirit of the invention, especially as defined in the following claims.

We claim:

1. A process for the reclamation of spent aluminum rolling oils, emulsions and dispersions, consisting essentially of iterations of one or more of the following steps:

(a) heating a spent aluminum rolling oil, emulsion or dispersion, which comprises an oil/water mixture containing oils, additives, and organometallic particles, to a temperature between 100° F. and less than 212° F.;

(b) contacting the oil/water mixture with only an acid to form a reaction mixture having a pH of between 0.5 and 2.5;

(c) separating the reaction mixture into a predominantly oil phase and a predominantly aqueous phase;

(d) analyzing the separated oil phase to determine its constituents; and (e) reconstituting the oil phase.

2. A process for the reclamation of spent aluminum rolling coolant oils, emulsions and dispersions, consisting essentially of iterations of one or more of the following steps:

(a) contacting a spent aluminum rolling oil, emulsion or dispersion, which comprises an oil/water mixture which contains oils, additives, and organometallic particles, with only an acid to form a reaction mixture having a pH from between 1 and 2;

(b) heating the reaction mixture to a temperature between 150 and less than 212° F.;

(c) agitating the reaction mixture;

(d) separating the reaction mixture into a predominantly oil phase and a predominantly aqueous phase;

(e) analyzing the separated oil phase to determine its constituents;

(f) reconstituting the oil phase.

3. A process in accordance with claim 2 in which a pretreatment step is used on an emulsion prior to the above process, the pretreatment step comprises one or more iterations of the following steps:

a) adding to the emulsion a sufficient quantity of an acidic solution to form a mixture having a pH of between 3 and 4;

b) heating the mixture to a temperature between 100 and less than 212° F. the reaction mixture containing predominant phases of approximately 20 to 30% oil to 70 to 80% water;

c) agitating the reaction mixture;

d) separating the reaction mixture into a predominantly oil phase and a predominantly aqueous phase.

4. A process in accordance with claim 1 wherein the acid is selected from the group consisting of: sulfuric, hydrochloric, nitric, acetic, citric, hydrofluoric, hydrobromic, and phosphoric.

5. A process in accordance with claim 2 wherein the acid is selected from the group consisting of: sulfuric, hydrochloric, nitric, acetic, citric, hydrofluoric, hydrobromic, and phosphoric.

6. A process in accordance with claim 3 wherein the acid is selected from the group consisting of: sulfuric, hydrochloric, nitric, acetic, citric, hydrofluoric, hydrobromic, and phosphoric.

7. A process in accordance with claim 2 wherein the reaction mixture is heated to a temperature between 180° F. and 212° F.

8. A process in accordance with claim 4 wherein the acid is selected from the group consisting of sulfuric, phosphoric and hydrochloric.

9. A process in accordance with claim 8 wherein the acid is sulfuric.

10. A process in accordance with claim 5 wherein the acid is selected from the group consisting of sulfuric, phosphoric and hydrochloric.

11. A process in accordance with claim 10 wherein the acid is sulfuric.

12. A process in accordance with claim 6 wherein the acid is selected from the group consisting of sulfuric, phosphoric and hydrochloric.

13. A process in accordance with claim 12 wherein the acid is sulfuric.

14. A process in accordance with claim 1 wherein the reaction mixture is allowed to separate into a predominantly oil and a predominant water phase by settling for between 2 and 120 hours.

15. A process in accordance with claim 2 wherein the reaction mixture is allowed to separate into a predominantly oil and a predominant water phase by settling for between 2 and 120 hours.

16. A process in accordance with claim 3 wherein the reaction mixture is allowed to separate into a predominantly oil and a predominant water phase by settling for between 2 and 120 hours.

17. A process in accordance with claim 14 wherein the reaction mixture is allowed to separate into a predominantly oil and a predominant water phase by settling for less than 72 hours.

18. A process in accordance with claim 15 wherein the reaction mixture is allowed to separate into a predominantly oil and a predominant water phase by settling for less than 72 hours.

19. A process in accordance with claim 1 wherein the oil phase is reconstituted by replacing the additives to substantially the same level as in an unused oil phase, the additives comprising antioxidants, corrosion inhibitors, biocides, and load bearing additives.

20. A process in accordance with claim 2 wherein the oil phase is reconstituted by replacing the additives to substantially the same level as in an unused oil phase, the additives comprising antioxidants, corrosion inhibitors, biocides, and load bearing additives.

21. A process in accordance with claim 3 wherein the oil phase is reconstituted by replacing the additives to substantially the same level as in an unused oil phase, the additives comprising antioxidants, corrosion inhibitors, biocides, and load bearing additives.

22. A process for the reclamation of spent aluminum rolling coolant oils, emulsions and dispersions, consisting essentially of iterations of one or more of the following steps:
    (a) contacting a spent aluminum rolling oil, emulsion or dispersion, which comprises an oil/water mixture which contains oils, additives, and organometallic particles, with only an acidic solution, wherein the acid is selected from the group consisting of sulfuric, phosphoric and hydrochloric, to form a reaction mixture having a pH from between 1 and 2;
    (b) heating the reaction mixture to a temperature between 180 and less than 212° F.;
    (c) vigorously agitating the reaction mixture;
    (d) allowing the reaction mixture to separate into a predominantly oil phase and a predominantly aqueous phase by settling for between 2 and 120 hours;
    (e) discarding the aqueous phase;
    (f) analyzing the separated oil phase to determine its constituents; and
    (g) reconstituting the oil phase by replacing the additives to substantially the same level as in the unused oil phase, the additives comprising antioxidants, corrosion inhibitors, biocides, and load bearing additives.

* * * * *